United States Patent
Al-Harthi et al.

(10) Patent No.: US 12,071,502 B2
(45) Date of Patent: Aug. 27, 2024

(54) METHOD OF MAKING AN ETHYLENE-PROPYLENE COPOLYMER

(71) Applicants: KING FAHD UNIVERSITY OF PETROLEUM AND MINERALS, Dhahran (SA); S-Oil Corporation, Seoul (KR)

(72) Inventors: Mamdouh A. Al-Harthi, Dhahran (SA); Sung-Gil Hong, Seoul (KR); Hassam Mazhar, Dhahran (SA); Farrukh Shehzad, Dhahran (SA)

(73) Assignees: KING FAHD UNIVERSITY OF PETROLEUM AND MINERALS, Dhahran (SA); S-Oil Corporation, Seoul (KR)

(*) Notice: Subject to any disclaimer, the term of this patent is extended or adjusted under 35 U.S.C. 154(b) by 9 days.

(21) Appl. No.: 17/970,011

(22) Filed: Oct. 20, 2022

(65) Prior Publication Data
US 2024/0132635 A1   Apr. 25, 2024
US 2024/0228677 A9   Jul. 11, 2024

(51) Int. Cl.
*C08F 4/02*      (2006.01)
*C08F 2/34*      (2006.01)
(Continued)

(52) U.S. Cl.
CPC ............ *C08F 4/76* (2013.01); *C08F 2/34* (2013.01); *C08F 4/6592* (2013.01); *C08F 210/16* (2013.01); *C08F 2800/00* (2013.01)

(58) Field of Classification Search
CPC ......... C08F 4/02; C08F 4/6592; C08F 210/16
See application file for complete search history.

(56) References Cited

U.S. PATENT DOCUMENTS 5,846,895 A   12/1998   Gila et al.
9,884,925 B2   2/2018   O'Hare et al.
(Continued)

FOREIGN PATENT DOCUMENTS

CN   108291032 A   7/2018
EP   3 143 052 B1   9/2019

OTHER PUBLICATIONS

Hassam Mazhar et al., "Degradation kinetics and thermomechanical properties of in-situ polymerized layered double hydroxides-ethylene-propylene copolymer", Journal Applied Polymer Science, 139 (16), Dec. 2021. (Year: 2021).*

(Continued)

*Primary Examiner* — Caixia Lu
(74) *Attorney, Agent, or Firm* — Oblon, McClelland, Maier & Neustadt, L.L.P.

(57) ABSTRACT

A method of making an ethylene-propylene (EP) copolymer includes immobilizing a metallocene catalyst on a layered double hydroxide (LDH) to form a supported metallocene catalyst complex. The method also includes mixing the supported metallocene catalyst complex in a nonpolar solvent to form a first mixture. The method further includes degassing the first mixture and saturating with a gaseous mixture of ethylene and propylene to form a second mixture. The method further includes mixing an aluminoxane catalyst with the second mixture to initiate a polymerization reaction of the ethylene and propylene to form a reaction mixture comprising the EP copolymer and separating the EP copolymer from the reaction mixture.

17 Claims, 4 Drawing Sheets

(51) Int. Cl.
      *C08F 4/6592*     (2006.01)
      *C08F 4/76*       (2006.01)
      *C08F 210/16*    (2006.01)

(56) References Cited

U.S. PATENT DOCUMENTS

| | | |
|---|---|---|
| 11,053,269 B2 | 7/2021 | O'Hare et al. |
| 2019/0284350 A1 | 9/2019 | Al-Harthi et al. |

OTHER PUBLICATIONS

Daud, et al.; Metallocene-Catalyzed Copolymerization of Ethylene and 1-Hexene in the Presence of Graphene/MgAl LDH Nanofiller: Effect on the Activity, SCB, and Thermal Stability; Arabian Journal for Science and Engineering; Apr. 10, 2018; 12 Pages.

Buffet, et al.; Metallocene supported core@LDH catalysts for slurry phase ethylene polymerization; Chemical Communications, Issue 21; 2016; 1 Page; Abstract Only.

Bae, et al.; Dinuclear metallocene complexes for high-performance supported catalysts; European Polymer Journal 144 (2021); 9 Pages.

Angpanitcharoen, et al.; Synthesis, characterisation and ethylene polymerisation performance of silyl bridged peralkylated bis(indenyl) zirconocenes; Molecular Catalysis 498 (2020); 12 Pages.

Hickman, et al.; Synthesis, characterisation and slurry phase ethylene polymerisation of rac-(PhBBI*)ZrCl2 immobilised on modified layered double hydroxides; Molecular Catalysis 468 (2019); 9 Pages.

* cited by examiner

METHOD OF MAKING AN ETHYLENE-PROPYLENE COPOLYMER

BACKGROUND

Technical Field

The present disclosure in general is directed to a method of making an ethylene-propylene copolymer, and particularly, to a method of making an ethylene-propylene copolymer with a metallocene catalyst supported on a layered double hydroxide.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Polyolefins offer a wide range of domestic and industrial applications with an estimated market valuve of $1.5 billion for the ethylene-propylene rubber (EPR) segment by 2024. EPR is an amorphous, random, and rubbery polymer obtained from the copolymerization of ethylene and propylene (EP). These EP copolymers have become a key component in various applications such as food packaging, automotive (hoses, gaskets, etc.), electrical wiring, and construction due to their attributes such as heat and electricity resistance, low moisture absorption, high clarity, and better chemical resistance to weathering and ozone [C. Silvestre, S. Cimmino, R. Triolo, Structure, morphology, and crystallization of a random ethylene-propylene copolymer, J. Polym. Sci. Part B Polym. Phys. 41 (2003) 493-500; W. Kaminsky, M. Miri, Ethylene Propylene Diene Terpolymers Produced with a Homogeneous and Highly Active Zirconium Catalyst., J. Polym. Sci. Al. 23 (1985) 2151-2164; and L. S. Baugh, J. A. M. Canich, Stereoselective polymerization with single-site catalysts, CRC Press, 2007.]. Zeigler-Natta or metallocene catalysts are typically used in the mass production of EP copolymers [M. Gahleitner, L. Resconi, P. Doshev, Heterogeneous Ziegler-Natta, metallocene, and post-metallocene catalysis: Successes and challenges in industrial application, MRS Bull. 38 (2013) 229-233.]. Compared with Zeigler-Natta catalysts, metallocene catalysts present a well-defined active site, an ordered structure, and a specific geometry, allowing them to (i) selectively produce EP copolymers at more constrained conditions such as at low temperatures and under reduced pressures [H. Mazhar, F. Shehzad, S.-G. Hong, M. A. Al-Harthi, Thermal Degradation Kinetics Analysis of Ethylene-Propylene Copolymer and EP-1-Hexene Terpolymer, Polymers (Basel). 14 (2022) 634; H. Mazhar, F. Shehzad, S. G. Hong, M. A. Al-harthi, Degradation kinetics and thermomechanical properties of in-situ polymerized layered double hydroxides-ethylene-propylene copolymer, J. Appl. Polym. Sci. (2021) 52002.], and (ii) yield polymers with high productivity, less energy input, and better quality [M. Gahleitner, L. Resconi, P. Doshev, Heterogeneous Ziegler-Natta, metallocene, and post-metallocene catalysis: Successes and challenges in industrial application, MRS Bull. 38 (2013) 229-233; J. Arranz-Andres, I. Suarez, R. Benavente, E. Perez, Characterization and properties of ethylene-propylene copolymers synthesized with homogeneous and supported metallocene catalyst in the whole range of compositions, Macromol. Res. 19 (2011) 351-363; Z. Gene Xu, S. Chakravarti, W. H. Ray, Kinetic study of olefin polymerization with a supported metallocene catalyst. II. Ethylene/1-hexene copolymerization in gas phase, J. Appl. Polym. Sci. 80 (2001) 1096-1119.].

There are challenges associated with unsupported catalysts in polyolefin synthesis including, lack of control over the morphology of the product and the reactor fouling which results in heat and mass transfer resistance. A supported catalyst provides better control over the polymer morphology, requires less co-catalyst, and provides the flexibility to tune the product properties [P. Kenyon, D. W. J. Leung, Z. R. Turner, J.-C. Buffet, D. O'Hare, Tuning Polyethylene Molecular Weight Distributions Using Catalyst Support Composition, Macromolecules. 55 (2022) 3408-3414; F. Shehzad, M. A. Al-Harthi, Graphite-LDH hybrid supported zirconocene for ethylene polymerization: Influence of the support on the crystallization kinetics and thermal stability of polyethylene, Appl. Clay Sci. 202 (2021) 105947.]. When using a supported catalyst, or heterogeneous catalyst, the chemical reaction takes place generally on such catalyst surface.

Layered double hydroxides (LDHs), also known as anionic clays, are layered hydrous inorganic compounds with a clay-like structure. The general formula of LDH is $[(M^{+2})_{1-x} (M^{+3})_x (OH)_{2(n+nm)}]^{n-}[(A^{n-})_{x/n} \cdot mH_2O]$ here $M^{+2}$, $M^{+3}$ stands for divalent and trivalent metal cations respectively, x represents a molar ratio of $M^{+2}$ ($M^{+2}+M^{+3}$) generally in the range of 0.2-0.33, and Ai can be a variety of charge balancing anions, such as $CO_3^{2-}$ and $SO_4^{2-}$ and m represent interlayer water molecules [F. Shehzad, M. A. Al-Harthi, Graphite-LDH hybrid supported zirconocene for ethylene polymerization: Influence of the support on the crystallization kinetics and thermal stability of polyethylene, Appl. Clay Sci. 202 (2021) 105947; G. Fan, F. Li, D. G. Evans, X. Duan, Catalytic applications of layered double hydroxides: recent advances and perspectives, Chem. Soc. Rev. 43 (2014) 7040-7066; F. Zhang, X. Xiang, F. Li, X. Duan, Layered Double Hydroxides as Catalytic Materials: Recent Development, Catal. Surv. from Asia. 12 (2008) 253-265.]. Due to its good thermal stability and chemical resistance, LDHs have been used as catalyst support to immobilize functional organic molecules and metal complexes [F. Li, X. Duan, Applications of layered double hydroxides, Struct. Bond. 119 (2005) 193-223; Z. P. Xu, J. Zhang, M. O. Adebajo, H. Zhang, C. Zhou, Catalytic applications of layered double hydroxides and derivatives, Appl. Clay Sci. 53 (2011) 139-150.]. The advantages of using LDHs as support in catalytic applications opens new possibilities for developing next generation catalytic materials.

Moreover, LDH-supported metallocene catalyst shows enhanced activity and selectivity in the ethylene polymerization reaction [P. Kenyon, D. W. J. Leung, Z. R. Turner, J.-C. Buffet, D. O'Hare, Tuning Polyethylene Molecular Weight Distributions Using Catalyst Support Composition, Macromolecules. 55 (2022) 3408-3414; J. C. Buffet, Z. R. Turner, R. T. Cooper, D. O'Hare, Ethylene polymerisation using solid catalysts based on layered double hydroxides, Polym. Chem. 6 (2015) 2493-2503.], due to the reduced diffusion distance between hydrocarbon chains, resulting in short-chain polymers. Additionally, the hydronium groups in LDH can form hydrogen bonds with metallocene catalysts, which further promotes the interaction between the catalyst and the growing polymer chain. In another case, the polymer synthesized via LDH-supported nickel-diimine catalysts shows improved thermal viscoelastic properties [F.-A. He, L.-M. Zhang, Organo-modified ZnAl layered double hydroxide as new catalyst support for the ethylene polymerization, J. Colloid Interface Sci. 315 (2007) 439-444.]. However, the immobilization of metal catalysts on the LDH support increases dispersion and enhances the accessibility of the active metal sites to the environment, thus the bond holding the catalyst seems more fragile, which results in the leaching of the active metal center out of the solid surface. Hence, there is a need for developing immobilization methods to produce bridged and unbridged metallocene catalysts on LDH with varying anions, and use such catalysts in EP copolymer production.

In view of the forgoing, one objective of the present disclosure is to provide a method of immobilizing a metallocene catalyst on a layered double hydroxide (LDH) support. A further objective of the present disclosure is to provide a method of making an ethylene-propylene (EP) copolymer with the metallocene catalyst supported on the layered double hydroxide.

SUMMARY

In an exemplary embodiment, a method of making an ethylene-propylene (EP) copolymer is described. The method includes immobilizing a metallocene catalyst on a layered double hydroxide (LDH) to form a supported metallocene catalyst complex. The method also includes mixing the supported metallocene catalyst complex in a nonpolar solvent to form a first mixture. In addition, the method includes degassing the first mixture and saturating with a gaseous mixture of ethylene and propylene to form a second mixture. The method further involves mixing an aluminoxane catalyst with the second mixture to initiate a polymerization reaction of the ethylene and propylene to form a reaction mixture comprising the ethylene-propylene copolymer. Furthermore, the method involves separating the ethylene-propylene copolymer from the reaction mixture.

In some embodiments, the LDH is at least one selected from the group consisting of a NiFe LDH, a ZnAl LDH, a MgAl LDH, a MgFe LDH, and a NiAl LDH. In some embodiments, the LDH has an intercalating anion selected from the group consisting of a carbonate anion, a carbonate/acetone anion, a nitrate anion, and a dodecyl sulfate (DDS) anion.

In some embodiments, the metallocene catalyst is at least one selected from the group consisting of a bis(cyclopentadienyl)zirconium(IV) dichloride, and a dichloro[rac-ethylenebis(indenyl)]zirconium(IV).

In some embodiments, the Zr based catalyst is immobilized on the LDH has a delaminated structure comprising charged crystalline particles. In some embodiments, the Zr based catalyst is immobilized on the LDH has a basal spacing in a range of 0.5 to 5 nm.

In some embodiments, the LDH has an intercalating anion selected from the group consisting of a carbonate anion, a carbonate/acetone anion, and a nitrate anion. In some embodiments, the LDH has a basal spacing of 0.5 to 1.0 nm.

In some embodiments, the LDH has a dodecyl sulfate (DDS) intercalating anion. In some embodiments, the LDH has a basal spacing of 2 to 3 nm.

In some embodiments, the LDH has a mean particle size in the lateral dimension of from to 100 microns (p).

In some embodiments, the LDH comprises a first metal and a second metal. In some embodiments, a molar ratio of the first metal to the second metal in a range of 2:1 to 4:1.

In some embodiments, the supported metallocene catalyst complex has a weight ratio of the metallocene catalyst to the LDH of 1:1 to 1:10.

In another exemplary embodiment, the method of making the ethylene-propylene (EP) copolymer further includes activating the LDH with a methylaluminoxane (MMAO) prior to immobilizing to form an activated LDH support (MAO/LDH).

In some embodiments, the methylaluminoxane is a 5-10 weight percent (wt %) methylaluminoxane solution in toluene based on a total weight of the methylaluminoxane solution.

In some embodiments, the gaseous mixture is 70-95 volume percent (v %) ethylene and 5-v % propylene based on a total volume of the gaseous mixture.

In some embodiments, the gaseous mixture has a pressure of 1-10 pound-force per square inch (psi) in the second mixture during the mixing.

In some embodiments, the supported metallocene catalyst complex is present in the first mixture at a concentration of 0.1 to 0.5 milligram per millimeter (mg/mL).

In some embodiments, the supported metallocene catalyst complex has a catalytic activity of 500 to 1200 kilograms of the EP copolymer per mole per hour per bar (kg EP/mol/hr/bar).

In some embodiments, the supported metallocene catalyst complex containing monovalent intercalating anions has a higher catalytic activity than the supported metallocene catalyst complex containing divalent intercalating anions.

In some embodiments, the ethylene-propylene copolymer has a higher molecular weight than an ethylene-propylene copolymer made by the same method but wherein the metallocene catalyst is not supported on an LDH.

In some embodiments, the ethylene-propylene copolymer has a higher polydispersity index (PDI) than an ethylene-propylene copolymer made by the same method but wherein the metallocene catalyst is not supported on an LDH.

In some embodiments, the ethylene-propylene copolymer has a higher melting temperature than an ethylene-propylene copolymer made by the same method but wherein the metallocene catalyst is not supported on an LDH.

In some embodiments, the ethylene-propylene copolymer has a better thermal stability than an ethylene-propylene copolymer made by the same method but wherein the metallocene catalyst is not supported on an LDH.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, reference numerals designate identical or corresponding parts throughout the several views. Further, as used herein, the words "a," "an" and the like generally carry a meaning of "one or more," unless stated otherwise.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

Furthermore, the terms "approximately," "approximate," "about," and similar terms generally refer to ranges that include the identified value within a margin of 20%, 10%, or preferably 5%, and any values therebetween.

As used herein, the term "polyolefin" refers to a polymer with a general formula $(CH_2CHR)_n$ where R is an alkyl group. Polyolefins are formed through the polymerization of olefins, also referred to as olefin monomers. Examples of olefins include but are not limited to, ethene, propene, and butene. A polyolefin may be a copolymer of different types of olefin monomers, for example polymerized ethene and propene.

As used herein, the term "polymer" refers to a material that includes a set of macromolecules. Macromolecules included in a polymer can be the same or can differ from one another in some fashion. A macromolecule can have any of a variety of skeletal structures, and can include one or more types of monomeric units. In particular, a macromolecule can have a skeletal structure that is linear or non-linear. Examples of non-linear skeletal structures include branched skeletal structures, such as those that are star branched, comb branched, or dendritic branched, and network skeletal structures. A macromolecule included in a homopolymer typically includes one type of monomeric unit, while a macromolecule included in a copolymer typically includes two or more types of monomeric units. Examples of copolymers include statistical copolymers, random copolymers, alternating copolymers, periodic copolymers, block copolymers, radial copolymers, and graft copolymers. As can be appreciated, a polymer can be provided in a variety of forms having different molecular weights, since a molecular weight of the polymer can be dependent upon processing conditions used for forming the polymer.

Accordingly, a polymer can be referred to as having a specific molecular weight or a range of molecular weights. As used herein with reference to a polymer, the term "molecular weight" can refer to a number average molecular weight, a weight average molecular weight, or a melt index of the polymer.

As used herein, "weight average molecular weight" or "M," refers to the average molecular weight of a polymer having molecules of different chain lengths. The weight average molecular weight can be determined for example, by gel permeation chromatography, light scattering, small angle neutron scattering, X-ray scattering, and sedimentation velocity.

As used herein, "number average molecular weight" or "$M_n$," refers to the average molecular weight of a polymer having molecules of different chain lengths. The number average molecular weight can be determined for example, by gel permeation chromatography (also known as size exclusion chromatography) or viscometry.

As used herein, "molecular weight polydispersity" (a polydispersity index (PDI)), is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity (1). For some natural polymers PDI is almost taken as unity. The PDI from polymerization is often denoted as:

$$PDI=M_w/M_n$$

$M_n$ is more sensitive to molecules of low molecular mass, while $M_w$ is more sensitive to molecules of high molecular mass. A polymer material is denoted by the term polydisperse if its chain lengths vary over a wide range of molecular masses.

As used herein, the term "polymerization" is a process of reacting monomer molecules together in a chemical reaction to form three-dimensional networks or polymer chains. Many forms of polymerization and different systems exist to categorize them are known in the art.

As used herein, the term "catalyst" refers to a substance that increases the rate and selectivity of a chemical reaction without itself undergoing any permanent chemical change.

As used herein, the term "thermal stability" or variations thereof refers to refers to resistance of a polymer to molecular weight degradation under thermal conditions. Thus, a polymer with poor thermal stability may show significant molecular weight degradation under thermal conditions.

As used herein, the term "alkyl", unless otherwise specified, refers to a straight, branched, or cyclic hydrocarbon fragment. Non-limiting examples of such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl. As used herein, the term "cyclic hydrocarbon" refers to a cyclized alkyl group. Exemplary cyclic hydrocarbon (i.e., cycloalkyl) groups include, but are not limited to, cyclopropyl, cyclobutyl, cyclopentyl, cyclohexyl, norbornyl, and adamantyl. Branched cycloalkyl groups, such as exemplary 1-methylcyclopropyl and 2-methycyclopropyl groups, are included in the definition of cycloalkyl as used in the present disclosure.

Aspects of the present disclosure are directed toward a method of making an ethylene-propylene (EP) copolymer with a metallocene catalyst supported on a layered double hydroxide (LDH). The EP copolymer obtained by the method of the present disclosure has (i) a higher molecular weight, (ii) a higher thermal stability, (iii) a higher melting temperature, and (iv) a higher polydispersity index (PDI) than an EP copolymer made by the same method but where the metallocene catalyst is not supported on an LDH, and where no LDH is present in the polymerization process.

According to a first aspect, the present disclosure relates to a method of making an ethylene-propylene (EP) copolymer. The method involves (i) immobilizing a metallocene catalyst on a layered double hydroxide (LDH) to form a supported metallocene catalyst complex, (ii) mixing the supported metallocene catalyst complex in a nonpolar solvent to form a first mixture, (iii) degassing the first mixture and saturating with a gaseous mixture of ethylene and propylene to form a second mixture, (iv) mixing an aluminoxane catalyst with the second mixture to initiate a polymerization reaction of the ethylene and propylene to form a reaction mixture comprising the ethylene-propylene copolymer, and (v) separating the ethylene-propylene copolymer from the reaction mixture.

Figure 4:
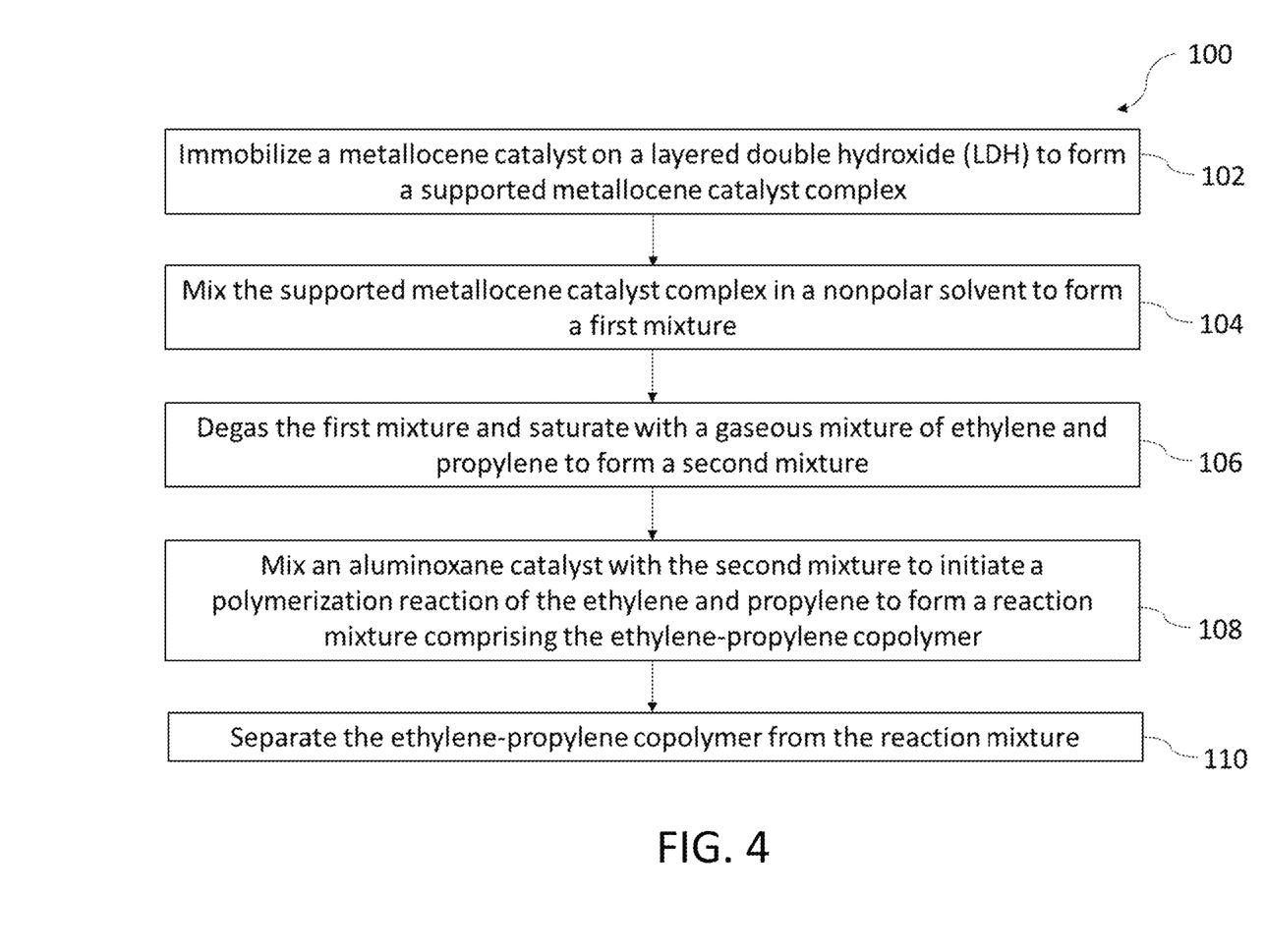
FIG. 4 is a schematic flow diagram of a method of making an ethylene-propylene (EP) copolymer, according to certain embodiments.

Referring to FIG. 4, a schematic flow diagram of a method 100 of making an ethylene-propylene (EP) copolymer is illustrated. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes immobilizing a metallocene catalyst on a layered double hydroxide (LDH) to form a supported metallocene catalyst complex. The metallocene catalyst may be a Ziegler-Natta polymerization catalyst useful for catalyzing olefin polymerization reactions from olefin monomers such as ethylene, propylene, n-butylene, 1-hexene, 1-octene as well as higher homologs and other olefin-containing compounds such as 1,3-butadiene. While any known heterogeneous Zeigler-Natta catalysts may be used, in preferred embodiments, the Zeigler-Natta catalyst is a homogeneous catalyst, for example, a metallocene catalyst based on complexes of Ti, Zr and/or Hf, and which may be employed in combination with an organoaluminum co-catalyst (e.g., methylaluminoxane, MAO). The combination of metallocene catalyst and organoaluminum co-catalysts renders these catalyst mixtures soluble in a wide array of common organic solvents, hence their classification as homogeneous catalysts. A metallocene is type of sandwich compound, based on an organometallic complex featuring a metal bound by haptic covalent bonds to two arene ligands. A metallocene is a compound typically containing two substituted or unsubstituted cyclopentadienyl anions (i.e., "cp" which is $C_5H_5$—) bound to a metal center (M) in the oxidation state II or IV, with the resulting general formula $(C_5H_5)_2M$ or $(C_5H_5)_2MX_2$, e.g., titanocene dichloride, vanadocene dichloride. When the metal of the metallocene is zirconium, the complex is then referred to as zirconocene. In one embodiment, the metallocene catalyst is zirconocene. In an embodiment, the zirconium has an oxidation state of −2, 0, 1, 2, 3, or 4. In one embodiment, the zirconium has an oxidation state of 4. In one embodiment, the zirconocene catalyst is any zirconocene catalyst known in the art. In another embodiment, the zirconocene catalyst is dichloro[rac-ethylenebis(indenyl)] zirconium (IV), dimethylsilylbis-(indenyl)zirconium dichloride, cyclopropylsilylbis(indenyl)-zirconium dichloride, bis(cyclopentadienyl) zirconium(IV) dichloride, and/or zirconocene dichloride. In some preferred embodiments, the zirconium catalyst may be bis(cyclopentadienyl)zirconium(IV) dichloride, and dichloro[rac-ethylenebis(indenyl)]zirconium (IV).

Layered double hydroxides (LDH) are layered, hydrous inorganic compounds with a clay-like structure. The general formula of LDH is $[(M^{+2})_{1-x} (M^{+3})_x(OH)_{2(n+nm)}]^{n-}$ $[(A^{n-})_{x/n} \cdot mH_2O)$ here $M^{+2}$, $M^{+3}$ stands for divalent and trivalent metal cations respectively, x represents a molar ratio of $M^{+2}$ $(M^{+2}+M^{+3})$ generally in the range of 0.2-0.33, and $A^{n-}$ can be a variety of charge balancing intercalating anions, such as dodecyl sulfate (DDS) $(CH_3(CH_2)_{11}OSO_3^-)$, $Cl^-$, $Br^-$, nitrate $(NO_3^-)$, carbonate $(CO_3^{2-})$, $SO_4^{2-}$, acetate $(C_2H_3O_2^-)$, $SeO_4^{2-}$, and combinations thereof.

The size and properties of the intercalating anions may have an effect on the spacing of the layers in the LDH, known as the basal spacing. Basal spacing values are measured using X-ray diffraction analysis (XRD). The radiation source is a high-intensity, copper target, X-ray tube operated at 50 Kv and 40 ma. The diffraction pattern from the copper K-alpha radiation and graphite monochromator is suitably recorded by an X-ray spectrometer scintillation counter, pulse height analyzer and strip chart recorder. Flat compressed powder samples are scanned at 2 (2 theta) per minute, using a two second time constant. Interplanar spacings (d) in Angstrom units are obtained from the position of the diffraction peaks expressed as 2r where r is the Bragg angle as observed on the strip chart. Intensities are determined from the heights of diffraction peaks after subtracting background, "I." being the intensity of the strongest line or peak, and "I" being the intensity of each of the other peaks. Alternatively, the X-ray patterns can be obtained by use of computer-based techniques using copper K-alpha radiation, Siemens type K-805 X-ray sources and Siemens D-500 X-ray powder diffractometers.

In an embodiment, the LDH has a basal spacing of 0.5 to 3 nm, preferably 1 to 2.5 nm, or more preferably 1.5 to 2 nm. In one embodiment, an LDH with an intercalated anion such as a carbonate anion, a carbonate/acetone anion, and a nitrate anion has a basal spacing of 0.5 to 1.0 nm, preferably 0.6 to 0.9 nm, or more preferably 0.7 to 0.8 nm. In another embodiment, an LDH with an intercalated anion such as a DDS anion has a basal spacing of 2.0 to 3.0 nm, preferably 2.2 to 2.8 nm, or more preferably 2.4 to 2.6 nm. The DDS anion can delaminate the LDH, or split apart the layers, creating larger gaps in the LDH due to its large size, and the hydrophobicity of the dodecyl alkyl tail. Other ranges are also possible.

An LDH may be synthetic or a naturally occurring layered double hydroxide. Naturally occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In some embodiments, the layered double hydroxide has a positive layer which contains both divalent and trivalent cations, also labeled as a first and second metal, respectively. In one embodiment, the divalent ion is selected from the group consisting of $M^{2+}$ is $Ca^{2+}$, $Mg^{2+}$, $Mn^{2+}$, $Fe^{2+}$, $Cu^{2+}$, $Ni^{2+}$, $Cu^{2+}$, and/or $Zn^{2+}$. In one embodiment, the trivalent ion is selected from the group consisting of $N^{3+}$ is $Al^{3+}$, $Mn^{3-}$, $Cr^{3+}$, $Sc^{3+}$, $Ga^{3+}$, $La^{3+}$, $V^{3+}$, $Sb^{3+}$, $Y^{3+}$, $In^{3+}$, $Co^{3+}$ and/or $Ni^{3+}$. In one embodiment, a molar ratio of a first and second metal in the LDH 2:1 to 4:1, preferably 2.4:1 to 3.8:1, preferably 2.8:1 to 3.2:1. In another embodiment, a molar ratio of a first and second metal in the LDH is 1:1.

In some preferred embodiments, the layered double hydroxide has a DDS intercalating anion. In one embodiment, the LDH is a Zn(II)/Al(III) layered double hydroxide (zinc-aluminum LDH or ZnAl LDH), where some $Zn^{2+}$ in a brucite-like structure (crystalline $Zn(OH)_2$) is substituted by $Al^{3+}$. In another embodiment, the LDH is a Ni(II)/Fe(III) layered double hydroxide. In another preferred embodiment, the LDH is a Mg(II)/Al(III) layered double hydroxide. In a further preferred embodiment, the LDH is a Mg(II)/Fe(III) layered double hydroxide. In an even more preferred embodiment, the LDH is a Ni(II)/Al(III) layered double hydroxide. In some embodiments, the LDH does not comprise graphene.

In one embodiment, the layered double hydroxide component may have a particulate form, for example in the form of spheres, granules, whiskers, sheets, flakes, plates, foils, fibers, and the like. In some embodiments, he layered double hydroxide particles may have a particle size of 40 to 100 nm, preferably 45 to 90 nm, preferably 50 to 80 nm, preferably 55 to 75 nm, preferably 60 to 70 nm. In some embodiments, the layered double hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered double hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm. In some embodiments, the LDH has a mean particle size in the lateral dimension of from 5 to 100 microns (µ), preferably 25 to 90µ, preferably 50 to 80µ, or more preferably about 75µ. Other ranges are also possible.

In some embodiments, the metallocene catalyst is supported on a support material to form a supported metallocene catalyst complex. A catalyst support refers to a solid material to which the catalyst is affixed, typically through interactions with atoms present on the surface of the support. The support may be inert or participate in the catalytic reaction. Common supports include carbon, alumina, and/or silica. By affixing a metallocene catalyst to the support, the metallocene catalyst does not dissolve in the reaction solution and instead forms a heterogeneous catalyst, or a catalyst with a different phase than the reactants or products.

The amount of surface area available to the metallocene catalyst on the support and the accessibility of that surface area to reactant chemisorption and product desorption affect the activity of the metallocene catalyst, i.e., the rate of conversion of reactants to products. Therefore, the surface area must be accessible to reactants and products as well as to heat flow. The chemisorption of a reactant by a metallocene catalyst surface is preceded by the diffusion of that reactant through the internal structure of the metallocene catalyst and the metallocene catalyst support. In the case of the present disclosure, the reactants are ethylene and propylene. The metallocene catalytic reaction of the reactants to a product is followed by the diffusion of the product away from the metallocene catalyst and metallocene catalyst support. Since the active metallocene catalyst compounds are often supported on the internal structure of a support, the accessibility of the internal structure of a support material to reactant(s), product(s) and heat flow is important. In the case of the present disclosure, the ethylene and propylene must be able to access the internal structure of the LDH to access the metallocene catalyst.

In a preferred embodiment, the metallocene catalyst is supported on an LDH. In some embodiments, the LDH is activated prior to affixing the metallocene catalyst to the surface. In one embodiment, an aluminoxane, preferably methylaluminoxane, is used to activate the LDH. The Al atom in the methylaluminoxane forms a covalent bond with a surface hydroxyl group of the LDH and thereby activates the support for anchoring a catalyst molecule. Therefore, the hydroxyl groups present in the layers of the LDH are employed to affix the metallocene to the surface. This may change the spacing between these layers and have an effect on how much of the metallocene catalyst is able to attach to the surface of the LDH. Larger spacing between the layers as discussed previously by employing an anion such as DDS, may allow for more metallocene to affix to the surface of the LDH and improve the activity of the supported catalyst complex.

In one embodiment, the supported metallocene catalyst complex has a weight ratio of the metallocene catalyst to the support of 1:1 to 1:10, preferably 1 to 10, preferably 1 to 9, preferably 1 to 7, preferably 1 to 6, preferably 1 to 5, preferably 1 to 4, preferably 1 to 3, preferably 1 to 2, or more preferably 1 to 1. In some embodiments, the metallocene catalyst is a zirconocene catalyst. In some embodiments, the support is an LDH. In some preferred embodiments, the supported metallocene catalyst complex has a weight ratio of the zirconocene catalyst to the LDH of 1:1 to 1:10, preferably 1 to 10, preferably 1 to 9, preferably 1 to 7, preferably 1 to 6, preferably 1 to 5, preferably 1 to 4, preferably 1 to 3, preferably 1 to 2, or more preferably 1 to 1. Other ranges are also possible.

At step 104, the method 100 includes mixing the supported metallocene catalyst complex in a nonpolar solvent to form a first mixture. In some embodiments, the non-polar solvent is an aromatic solvent, most preferably an aromatic hydrocarbon. Exemplary aromatic solvents include, but are not limited to, benzene, ethylbenzene, o-xylene, m-xylene, p-xylene, and mixtures of xylenes, toluene, mesitylene, anisole, 1,2-dimethoxybenzene, α,α,α,-trifluoromethylbenzene, and fluorobenzene. In some embodiments, the organic solvent is an alkane solvent. Exemplary alkane solvents include, but are not limited to, pentane, cyclopentane, hexanes, cyclohexane, heptanes, cycloheptane, and octanes. In some preferred embodiments, the organic solvent is toluene. Other organic solvents that may be used, particularly as co-solvents, include ethers (e.g. diethyl ether, tetrahydrofuran, 1,4-dioxane, tetrahydropyran, t-butyl methyl ether, cyclopentyl methyl ether, di-isopropyl ether), glycol ethers (e.g. 1,2-dimethoxyethane, diglyme, triglyme), chlorinated solvents (e.g. chlorobenzene, dichloromethane, 1,2-dichloroethane, 1,1-dichloroethane, chloroform, carbon tetrachloride), ester solvents (e.g. ethyl acetate, propyl acetate), ketones (e.g. acetone, butanone). Mixtures of any of the above organic solvents may also be utilized.

The amount of organic solvent employed may be varied, but typically the organic solvent may be added so that the supported metallocene catalyst complex has a weight in mg to volume of solvent (mL) of 0.1 to 2 mg/mL, preferably 0.5 to 1 mg/mL, preferably 0.75 to 1.5 mg/mL. In some preferred embodiment, the first mixture has a supported metallocene catalyst complex concentration of 0.1-0.5 mg/mL, preferably 0.2-0.4 mg/mL, or approximately 0.3 mg/mL. Other ranges are also possible.

At step 106, the method 100 further includes degassing the first mixture and saturating with a gaseous mixture of ethylene and propylene to form a second mixture. Preferably, the gaseous mixture contains at least one α-olefin group but may contain more than one in the case of diene or polyene monomers. The gaseous mixture may be a single monomer if a homopolymer is desired or a mixture of monomers if a copolymer is desired. Gaseous mixture suitable for polymerization reactions are known to those of ordinary skill and may include olefin monomers having 2 to 12 carbons, preferably 3 to 10 carbons, preferably 4 to 8 carbons, preferably 5 to 6 carbons, examples of which include ethene, propene, butene, isobutene, 1,3-butadiene, 1-pentene, 1-hexene, hexadiene, 1-octene, 1-decene, isoprene, styrene, 4-methylpent-1-ene, and the like. In one embodiment, the gaseous mixture is ethylene and propylene. In one embodiment, the gaseous mixture is 70-95 volume percent (v %) ethylene and 5-30 v % propylene based on a total volume of the gaseous mixture. In another embodiment, the gaseous mixture is 80-85 v % ethylene and 15-20 v % propylene based on the total volume of the gaseous mixture. In an alternate embodiment, the gaseous mixture is 90-95 v % ethylene and 5-10 v % propylene based on the total volume of the gaseous mixture. In one embodiment, the gaseous mixture comprising ethylene and propylene is introduced into the first mixture under positive pressure, for example from 1-10 pound-force per square inch (psi), preferably 2-9 psi, 3-8 psi, 4-7 psi, or 5-6 psi. In some embodiments, the first mixture may be fully saturated or partially saturated with the ethylene and propylene monomers in the gaseous mixture. Preferably, the ethylene and propylene monomers in the gaseous mixture are added to the first mixture until saturation. The quantity of the ethylene and propylene monomers in the gaseous mixture added into the polymerization mixture may be controlled and adjusted in order to control the molecular weight and branching of the EP copolymer produced. In one embodiment, the gaseous mixture may be continuously fed into the second mixture and throughout the polymerization reaction (as described later) to maintain the positive pressure. Therefore, as the pressure of the gaseous mixture is maintained, a polymerization reaction may continue until the catalysts are no longer viable.

At step 108, the method 100 further includes mixing an aluminoxane catalyst with the second mixture to initiate a polymerization reaction of the ethylene and propylene to form a reaction mixture comprising the ethylene-propylene copolymer. The metallocene catalyst in a Ziegler-Natta polymerization reaction may be accurately referred to as a pre-catalyst, it is not responsible for the catalytic polymerization. Instead, the metallocene or zirconocene converts to the active catalyst in-situ after reaction with a co-catalyst. A co-catalyst is a chemical species that acts upon a catalyst for reaction to occur, or that improves the catalytic activity of a catalyst by acting as a promoter in a cooperative catalytic process. In the Ziegler-Natta reaction, the co-catalyst may be an organoaluminium compound which performs a ligand exchange reaction with the metallocene catalyst, ultimately forming a cationic metal species that catalyzes the olefin polymerization reaction. In the present method, the organoaluminium co-catalyst may be an aluminoxane co-catalyst. In some embodiments, the aluminoxane catalyst is methylaluminoxane, ethylaluminoxane, propylaluminoxane, and/or butylaluminoxane. In a preferred embodiment, the aluminoxane catalyst is methylaluminoxane.

In one embodiment, a weight ratio of the metallocene catalyst complex to the aluminoxane catalyst is 30:1 to 70:1, preferably 35:1 to 65:1, preferably 40:1 to 60:1, preferably 45:1 to 55:1, preferably 50:1 to 53:1, preferably about 52:1. The aluminoxane co-catalyst is preferably added to the polymerization mixture as a solution in organic solvent (e.g., in toluene), most preferably, the aluminoxane co-catalyst is the last component added to the polymerization reaction. In some embodiments, the methylaluminoxane is a 5-10 weight percent (wt %) methylaluminoxane solution in toluene based on a total weight of the methylaluminoxane solution. In some preferred embodiments, the methylaluminoxane is a 7 wt % methylaluminoxane solution in toluene based on the total weight of the methylaluminoxane solution. Other ranges are also possible.

Other organoaluminum co-catalysts may be utilized in addition to, or in lieu of, the alkylaluminoxane co-catalysts above, examples of which include the C1-C12 trialkylaluminum compounds described above (e.g., trimethylaluminum, triethylaluminum, triisopropylaluminum, tri-n-propylaluminum, triisobutylaluminum, tri-n-pentylaluminum, trioctylaluminum), C1-C12 dialkylaluminum monohalides (e.g., diethylaluminum monochloride, diethylaluminum monobromide, diethylaluminum monoiodide, diisopropylaluminum monochloride, diisobutylaluminum monochloride, and dioctylaluminum monochloride), C1-C12 alkylaluminum sesquihalides (e.g., methylaluminum sesquichloride, ethylaluminum sesquichloride, ethylaluminum sesquibromide, and butylaluminum sesquichloride), as well as mixtures thereof.

In some embodiments, the polymerization reaction is for at least 10 minutes, preferably 30 mins, 1 hour, 2 hours, 3 hours, 4 hours, 5 hours, 6 hours, 7 hours, 8 hours, 9 hours, 10 hours, 11 hours, 12 hours, or 24 hours. In some embodiments, the polymerization reaction occurs until the catalysts are no longer viable. In some embodiments, the reaction is quenched with an acid and/or an alcoholic solvent, for example, acidic methanol. In an embodiment, the reaction is quenched by washing with methanol containing 4-6 wt. % of HCl based on a total weight of the methanol. In some embodiments, the polymerization reaction may be performed at room temperature or at elevated temperature, for example, the polymerization mixture may be optionally heated up to 100° C., preferably up to 80° C., preferably up to 60° C., preferably up to 40° C., preferably up to 30° C. Other ranges are also possible.

In a preferable embodiment of the present disclosure, the nonpolar solvent (preferably toluene) supersaturated with the gaseous mixture of ethylene and propylene is continuously added to the reactor during the reacting time. Supersaturation of the gaseous mixture of ethylene and propylene in the nonpolar solvent provides mixtures that contain 5-15 wt. %, preferably 7-12 wt. % or about 10 wt. % of the ethylene and propylene monomers based on the total weight of the gaseous mixture and the nonpolar solvent. In order to achieve supersaturation the toluene must be pressurized with the gaseous mixture of ethylene and propylene and injected under pressure into the polymerization reactor. In an embodiment, the pressure is 1-20 psi, preferably 5-15 psi, or approximately 10 psi. In an embodiment, the reaction takes place in a reactor with a cubic, spherical, or hemispherical shape. The supersaturated solution is preferably injected at a plurality of locations at the bottom of the polymerization reactor. In a preferred embodiment, the supersaturated solution is injected circumferentially around a hemispherical bottom portion of the polymerization reactor. Injection of the supersaturated solution in this manner encourages mixing of the supported metallocene catalyst in the polymerization reactor, e.g., by turbulence cause by rapid depressurization of the supersaturated solution. Excess toluene solvent may be removed slowly from a location near the liquid line of the solvent in the polymerization reactor. The solvent is preferably removed through a strainer that blocks passage of the supported metallocene catalyst but otherwise permits toluene to exit the reactor under pressure.

At step 110, the method 100 further includes separating the ethylene-propylene (EP) copolymer from the reaction mixture. In some embodiments, the EP copolymer is separated by any method known to those with skill in the art. In some embodiments, the EP copolymer is separated from the reaction mixture via filtration or centrifugation. In some embodiments, the filtered EP copolymer is further dried for a range of 35° C. to 45° C. for a time duration of 10-20 hours, preferably 12-18, or more preferably 14-16 hours. Other ranges are also possible.

Further, the EP copolymer may be additionally altered after formation to instill any desired polymer properties. The additional alterations may comprise any post polymerization technique that modifies polymeric properties, such as vulcanization, grafting, and/or cross-linking. Further polymer processing techniques, such as blow molding, thermoforming, coating, extrusion, injection molding, fiber spinning, filament winding, pultrusion, and the like are considered to be within the scope of the present method.

After the in-situ polymerization, the EP copolymer may be manipulated/manufactured to have any desired shape. For example, the EP copolymer may be manufactured to be in the form of sheets, particles, granules, extrudates, lumps, spheres, spheroids, cubes, cuboids, rods, fibers, flakes, plates, tubes or other hollow shapes, polygons, pipes, hose, wire, cable or any other desirable shape. For example, the EP copolymer may be subject to known plastic processing steps, and thus may be melted, blended, extruded, molded, compressed, casted, cooled, solidified, etc. to have any desirable shape suitable for a particular application.

In some embodiments, the presence the LDH support during polymerization impacts the structure and properties of the polymer produced. In one embodiment, enough LDH is employed in the polymerization method so as to produce an EP copolymer having 0.05 to 3 wt. %, preferably 0.1 to 3 wt. %, preferably 0.2 to 3 wt. %, preferably 0.4 to 2.5 wt. %, preferably 0.6 to 2 wt. %, preferably 0.8 to 1.8 wt. %, preferably 1 to 1.6 wt. % of the support (LDH) relative to a total weight of the EP copolymer.

In the supported metallocene catalyst complex, the LDH can behave as a barrier by only allowing an amount of ethylene and propylene to interact with the metallocene catalyst by diffusing into the gaps of the LDH at any time during the polymerization reaction. In one embodiment, this may make a copolymer with only one fraction and reduce the amount of branching. The LDH can also scavenge the released combustible gases during polymerization, due to the presence of many ions in the LDH. Therefore, it may impart resistance against thermal degradation and facilitate better thermal stability. In this method, the catalyst is on the surface or in the gaps of the LDH and the ethylene and propylene monomers may be adsorbed in the gaps of the LDH for polymerization to occur. Where the size of the gap effects how much of the ethylene and propylene can be adsorbed at any given time. As described previously the intercalating DDS anion in an LDH increases the basal spacing and therefore may allow more of the ethylene and propylene to penetrate between the layers and interact with the metallocene catalyst supported on the LDH. The effect may further be supported by the use of larger metal cations in the LDH such as zinc. Supporting the metallocene catalyst on an LDH results in improved reaction conditions and improved thermal properties of the resulting EP copolymer.

Catalyst activity is measured by the amount of metallocene catalyst added to the reaction in kg, per mol of the ethylene-propylene gaseous mixture, per hour of the reaction duration, and per pressure of the ethylene-propylene gaseous mixture in the reaction in bar. In some embodiments, the supported metallocene catalyst complex has a higher activity than a metallocene catalyst that is not supported on an LDH or any support. In one embodiment, the activity of the supported metallocene catalyst complex is 1% higher, preferably 5%, 10%, 15%, 20%, 25%, 30%, 35%, 40%, 45%, or 50% higher than a metallocene catalyst is not supported on an LDH or any support. In another embodiment, the supported catalyst complex has an activity of 500-1200 kg EP/mol/hr/bar, preferably 600-1,100, preferably 650-1,050, preferably 700-1,000, preferably 750-950, preferably 800-900, or approximately 850 kg EP/mol/hr/bar. The higher activity of the metallocene catalyst in the supported metallocene catalyst complex allows for more EP copolymer to be made. Other ranges are also possible.

In some embodiments, the EP copolymer made with the supported metallocene catalyst complex has a higher yield than an EP copolymer made by the same method but where the metallocene catalyst is not supported on an LDH, and no LDH is present in the polymerization reaction. In some embodiments, the yield of the EP copolymer is calculated based on a total weight of olefin monomers used to form the EP copolymer. In one embodiment, the yield of the EP copolymer made with the supported catalyst complex is 1% higher, preferably 5%, 10%, 15%, 20%, 25%, 30%, 35%, 40%, 45%, or 50% higher than an EP copolymer made by the same method but where the metallocene catalyst is not supported on an LDH, and no LDH is present in the polymerization reaction. Other ranges are also possible.

In some embodiments, the EP copolymer made with the supported metallocene catalyst complex has a higher molecular weight than an EP copolymer made by the same method but where the metallocene catalyst is not supported on an LDH, and no LDH is present in the polymerization reaction. In one embodiment, the weight average molecular weight ($M_w$) of the EP copolymer made with the supported catalyst complex is 10% higher, preferably 50%, 100%, 200%, 300%, 600%, 800%, or 1000% higher than an EP copolymer made by the same method but where the metallocene catalyst is not supported on an LDH, and no LDH is present in the polymerization reaction. In another embodiment, the number average molecular weight ($M_n$) of the EP copolymer made with the supported catalyst complex is 10% higher, preferably 50%, 100%, 200%, 300%, 600%, 800%, or 1000% higher than an EP copolymer made by the same method but where the metallocene catalyst is not supported on an LDH, and no LDH is present in the polymerization reaction. Other ranges are also possible.

In some embodiments, the EP copolymer made with the supported metallocene catalyst complex has a higher polydispersity index (PDI) than an EP copolymer made by the same method but where the metallocene catalyst is not supported on an LDH, and no LDH is present in the polymerization reaction. In one embodiment, the PDI of the EP copolymer made with the supported catalyst complex is 1% higher, preferably 10%, 15%, 20%, 25%, 30%, 35%, 40%, 45%, 50%, or 100% higher than an EP copolymer made by the same method but where the metallocene catalyst is not supported on an LDH, and no LDH is present in the polymerization reaction. Other ranges are also possible.

In some embodiments, the EP copolymer made with the supported catalyst complex has a higher melting temperature than an EP copolymer made by the same method but where the metallocene catalyst is not supported on an LDH, and no LDH is present in the polymerization reaction. In some embodiments, the EP copolymer made with the supported metallocene catalyst complex has a melting temperature at least 1° C. higher, preferably 10° C., 50° C., 100° C., 150° C., 200° C., 250° C., or 300° C. higher, than an EP copolymer made by the same method but where the metallocene catalyst is not supported on an LDH, and no LDH is present in the polymerization reaction. In a preferred embodiment, the EP copolymer made with the supported catalyst complex has a unimodal, or only one, melting temperature. In an embodiment, the EP copolymer has one fraction of polymer. In some embodiments, the EP copolymer made with the supported metallocene catalyst complex has 2, 3, 4, 5, or 6 melting temperatures. In an embodiment, the EP copolymer has multiple fractions of different branched polymers. Other ranges are also possible.

In some embodiments, the EP copolymer made with the supported catalyst complex has a better thermal stability than an EP copolymer made by the same method but where the metallocene catalyst is not supported on an LDH, and no LDH is present in the polymerization reaction. In some embodiments, the EP copolymer made with the supported metallocene catalyst complex is stable up to 400° C., preferably 450° C., or 500° C. In some embodiments, the EP copolymer made with the supported metallocene catalyst complex is stable from 400-460° C., preferably 410-450° C., 420-440° C., or approximately 430° C. In some embodiments, the EP copolymer made with the supported catalyst complex is stable from 430-450° C. Other ranges are also possible.

EXAMPLES

The following examples describe and demonstrate exemplary embodiments of the method 100 of making the EP copolymer described herein. The examples are provided solely for illustration and are not to be construed as limitations of the present disclosure, as many variations thereof are possible without departing from the spirit and scope of the present disclosure.

Materials

Ethylene-propylene (95:05) gas mixture (99% pure), bis (cyclopentadienyl)Zirconium(IV) dichloride (denoted as Zr catalyst), dichloro[rac-ethylenebis(indenyl)]zirconium(IV) (denoted as B—Zr catalyst), modified methylaluminoxane (MMAO, 7% w/w in toluene), zinc nitrate hexahydrate[Ni $(NO_3)_2 \cdot 6H_2O$], $Ni(NO_3)_2 \cdot 6H_2O$ and other metal precursor salts, sodium dodecyl sulfate, toluene, ethanol, and methanol.

Example 1: Synthesis of LDH

The components of the LDH were varied. Different LDHs were made including ZnAl, MgAl, MgFe, NiFe, NiAl, and then the intercalating anion of the LDH was varied including, dodecyl sulfate (DDS), nitrate ($NO_3$), carbonate ($CO_3$), and carbonate/acetone ($CO_3$/Acetone). The reported combinations include, NiFe-DDS, NiFe—$NO_3$, NiFe—$CO_3$, NiFe—$CO_3$/Acetone, ZnAl-DDS, MgAl-DDS, MgFe-DDS, NiAl-DDS. Herein we are reporting the synthesis of NiFe LDH, however other LDH were produced by a similar co-precipitation method. The salts precursor solution was prepared by mixing 8.73 g of $Ni^{2+}$ and 4.04 g of $Fe^{3+}$ with the molar ratio of 3:1 ($M^{2+}:M^{3+}$) in 50 mL deionized water under vigorous stirring at 60° C. for 15 minutes. A precursor salt (0.02 mol) solution of the anion to be intercalated in the LDH was prepared in 50 mL of water. The metal salt solution was added dropwise to the precursor salt solution at a pH equal to 10±0.1 maintained by 2M NaOH solution. The whole suspension was then allowed to reflux for 24 h at 70° C. under continuous magnetic stirring followed by centrifuging and washing with deionized water and pure ethanol to remove any impurities. The wet NiFe LDH cake was dried in a vacuum oven at 60° C. for 20 hours. The dried LDH powder was afforded by grinding and sieving (particle size <200 mesh).

The LDH with intercalated nitrate or carbonate anion exhibits an average basal spacing of 0.6-0.9 nm, preferably 0.7-0.8 nm based on XRD analysis. For example, an LDH with NiFe—$NO_3$ has an average basal spacing of 0.76 nm, an LDH with NiFe—$CO_3$ has an average basal spacing of 0.775 nm, and an LDH with NiFe—$CO_3$/Acetone has an average basal spacing of 0.812 nm. An LDH was also treated with anionic surfactant (sodium dodecyl sulfate) to form delaminated LDH. The DDS anion was intercalated into the galleries of delaminated LDHs through an ion-exchange method and direct intercalation. The modified LDH-DDS has a very high basal spacing of 2-3 nm, preferably about 2.4 nm based on XRD analysis. For example, an LDH with NiFe-DDS has an average basal spacing of 2.85 nm, an LDH with ZnAl-DDS has an average basal spacing of 2.6 nm, an LDH with MgAl-DDS has an average basal spacing of 2.4 nm, and an LDH with MgFe-DDS has an average basal spacing of 2.4 nm.

Example 2: Thermal Treatment of the LDH

Different LDHs were used as the support for the catalyst. Due to the presence of hydroxyl ions and free water molecules in the layers of the LDH, the LDHs should be thermally treated before catalyst immobilization. LDHs were thermally treated at a temperature of 150° C. for 6 hours in a nitrogen environment. Subsequently, the LDHs were transferred to the glove box to avoid the absorption of any moisture.

Example 3: Support of the Catalyst on the LDH

The zirconocene (Zr) and the bridge (B—Zr) catalyst were supported on various LDH supports (as mentioned in the previous section) based on the procedure similar to the one reported by Hickman et al. [G. E. Hickman, C. M. R. Wright, A. F. R. Kilpatrick, Z. R. Turner, J. C. Buffet, D. O'Hare, Synthesis, characterization and slurry phase ethylene polymerization of rac-(PhBBI*)ZrCl$_2$ immobilized on modified layered double hydroxides, Mol. Catal. 468 (2019) 139-147] with modifications. The supported catalyst complex synthesis is a two-step process. The supported catalyst synthesis has two steps (1) activation of the support with the co-catalyst, modified methylaluminoxane (MAO 7% MAO in toluene, purchased from Sigma Aldrich), and (2) immobilization of the catalyst over the activated support. At step (1), 100 mg of the LDH was added to the 10 ml of anhydrous toluene in a 100 ml Schlenk flask inside the glove box. To the same system 3.3 ml of MMAO was added, MMAO reacts incautiously with the surface hydroxyl where the aluminum atom gets linked with the surface oxygen while the alkyl group reacts with hydrogen of the hydroxyl group resulting into the into fumes due to evolution of methane or higher alkane gases. The reaction system is maintained at 80° C. under occasional gentle stirring after every 5 minutes for 2 hours. After 2 hours of the reaction time, the reaction system is subjected to the vacuum drying to obtain activated support in dry powder form. The activated support is denoted as MAO/LDH.

At step (2), about 170 mg of the MMAO activated LDH support (MMAO/LDH) was added to 100 ml Schlenk flask along with 10 ml of toluene inside the glovebox. To the same system about 37 mg (0.13 moles) of Zr (while in case of supporting the bridge catalyst 54 mg of (B—Zr) was added.

The reaction mixture was maintained at 60° C. with occasional gentle stirring every 10 mins for 1 hour. The solvent used in the reaction was vacuum dried and the residue is grinded to afford the supported catalyst (Zr/MAO/LDH).

Example 4: Polymerization Reaction

The EP co-polymerization were performed using the homogenous bis(cyclopentadienyl)Zirconium(IV) dichloride $Cp_2ZrCl_2$ (Zr) catalyst and Zr/LDHs complex, respectively. Zr was supported on ZnAl LDH, and NiFe LDH with varying intercalating anions ($CO_3$, $CO_3$/Acetone, $NO_3$, DDS) within the galleries of the NiFe LDH. Additionally, the homogenous catalyst was also supported on various LDHs (NiFe, ZnAl, MgAl, MgFe, NiAl) with keeping intercalating DDS anion fixed to form Zr/LDH(DDS) complex.

The in-situ copolymerization reaction of ethene and propene was carried out in a Schlenk flask at a temperature of 60° C. and a pressure of 5 psi under vigorous stirring conditions. Primarily, the reactor system was charged with 80 mL of toluene as solvent and 22 mg of the Zr/LDH supported catalyst complex. The reactor system was maintained at the specified temperature and pressure conditions. The nitrogen initially present in the reactor was evacuated through a vacuum pump and was then pressurized with a molar ratio of 95-05 ethene-propene gas at a pressure of 5 psi. After 10 minutes of feed gas saturation in the toluene solvent, 5 mL of MAO co-catalyst was injected into the system to initiate the polymerization reaction. The reaction was carried out for 30 minutes followed by quenching with 100 mL of methanol containing 5% HCl for 45 minutes. The product was washed with an excess of methanol and filtered off, and the final product was obtained after drying at 40° C. for 16 hours.

The resulting polymer is labeled as "EP" due to the polymerization of ethene and propene. A control of an EP copolymer made without the Zr catalyst supported on an LDH, and no LDH is present in the reaction is labeled as "Neat EP". The Neat EP is made under the same conditions described above but without an LDH present.

Example 5: Gel Permeation Chromatography (GPC) Analysis

The GPC analysis were performed to analyze the polymer microstructure, it measures the weight average molecular weight ($M_w$), number average molecular weight ($M_n$) and the polydispersity index (PDI) of the polymer. The GPC analysis of EP polymer samples were performed. About 5 mg of the EP samples were allowed to dissolve in trichloro benzene (TCB) solvent for 10 hours followed by the injection of the solution in the equipment. GPC separates the dissolved polymer by size based on their elution time from the column filled with porous gel.

Example 6: EP Copolymer Yield Characterization

The catalytic activities of the supported catalyst were appreciably high. The homogenous Zr catalyst exhibited activity of 881 kg EP/mol/hr/bar while the supported Zr over NiFe—$CO_3$ and NiFe—$CO_3$/A (NiFe—$CO_3$ LDH modified with acetone solvent) showed relatively lower activity of 650 and 635 kg EP/mol/hr/bar, respectively as compared to the homogenous catalyst. Moreover, the supported Zr catalyst over NiFe with intercalating DDS and $NO_3$ anions showed relatively higher activity of 1020 and 1037 kg EP/mol/hr/bar, respectively than its homogenous analogue.

Buffet et al. [J. C. Buffet, N. Wanna, T. A. Q. Arnold, E. K. Gibson, P. P. Wells, Q. Wang, J. Tantirungrotechai, D. Ohare, Highly tunable catalyst supports for single-site ethylene polymerization, Chem. Mater. 27 (2015) 1495-1501.] in one of his papers reported similar observation regarding ethylene polymerization in which the intercalating sulfate anion in MgA showed higher activity than that of the carbonate anion.

Figure 1:
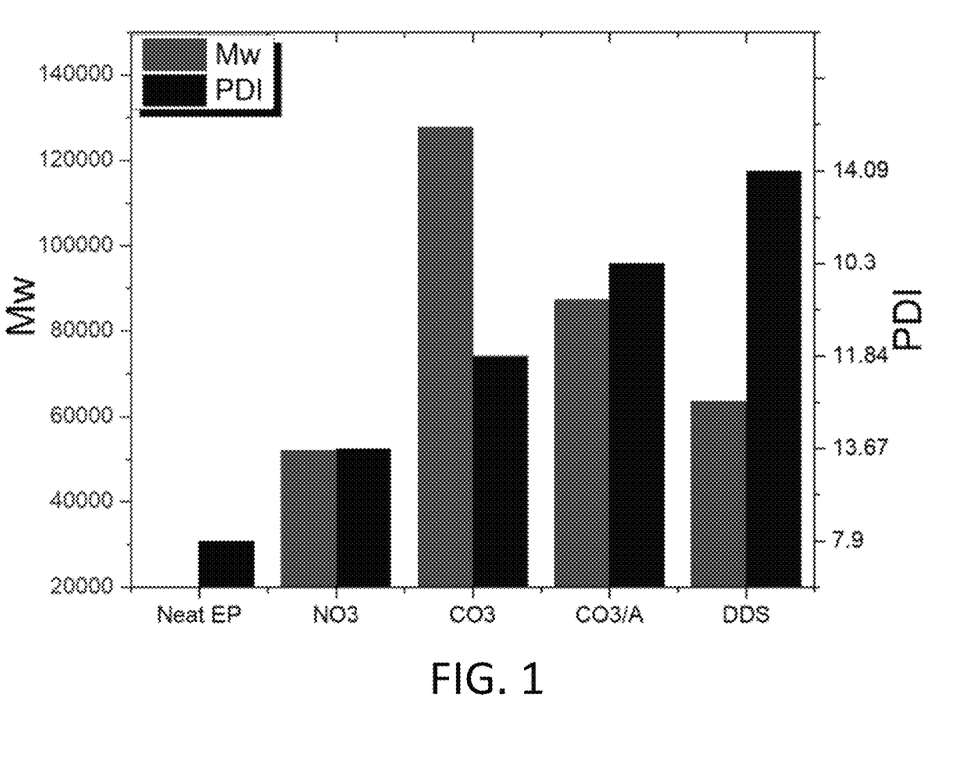
FIG. 1 is a graph depicting the effect of anion intercalation over M, and PDI values of the EP copolymer produced by Zr/MAO/NiFe(anions) supported catalyst complex, according to certain embodiments.

The intercalating anion in the supported catalyst complex impacts its catalytic activity. An observation worth noting is the supported catalyst complex containing monovalent intercalated anions showed higher activity than that of the divalent anions as depicted in Table 1 and FIG. 1.

TABLE 1

Effect of intercalated anion over the activity of Zr/MAO/LDH catalyst and the $M_n$, $M_w$ and PDI values of the produced EP copolymer Bis(cyclopentadienyl)Zirconium(IV)dichloride

| | Support | EP Yield# | activity kg EP/mol/hr/bar | Mn* | Mw* | PDI* |
|---|---|---|---|---|---|---|
| Anion effect | Homogenous (Neat EP) | 3.12 | 881.868 | 1627 | 12854 | 7.90 |
| | NiFe-$NO_3$ | 3.61 | 1020.3665 | 3786 | 52195 | 13.67 |
| | NiFe-$CO_3$ | 2.3 | 650.095 | 11896 | 127766 | 11.84 |
| | NiFe-$CO_3$/A | 2.25 | 635.9625 | 9087 | 87287 | 10.30 |
| | NiFe-DDS | 3.67 | 1037.3255 | 4684 | 63570 | 14.09 |

Figure 2:
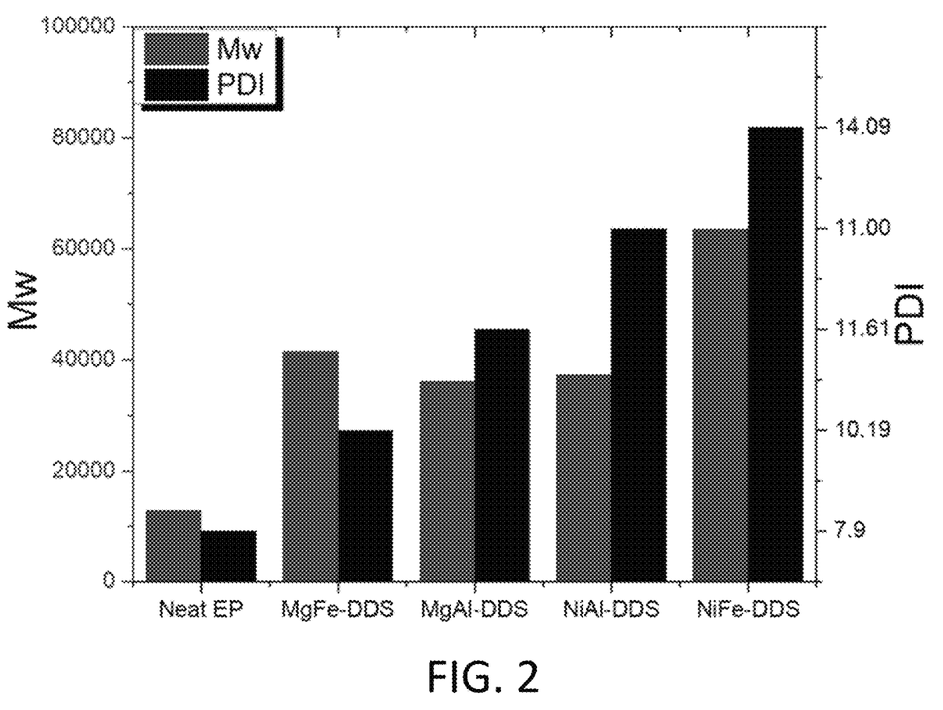
FIG. 2 is a graph depicting the effect of metal composition in the LDH over M, and PDI values of the EP copolymer produced by Zr/MAO/LDH (DDS), according to certain embodiments.

The supported catalyst complex with varying metals in the LDH support showed appreciable activity, and the activity of supported catalyst complex is depicted in Table 2 and FIG. 2. The supported catalyst comprising NiFe LDH and ZnAl LDH showed highest activity of 1037 and 937 kg EP/mol/hr/bar, respectively.

TABLE 2

Shows the effect of different LDHs over the activity of Zr/MAO/LDH catalyst the Mn, Mw and PDI values of the produced EP copolymer Bis(cyclopentadienyl)Zirconium(IV) dichloride

| | Support | Yield# | activity kg EP/mol/hr/bar | Mn* | Mw* | PDI* |
|---|---|---|---|---|---|---|
| LDH effect | NiFe-DDS | 3.67 | 1037.3255 | 4684 | 63570 | 14.09 |
| | MgFe-DDS | 2.35 | 664.2275 | 3806 | 41423 | 10.19 |
| | MgAl-DDS | 3.16 | 893.174 | 3111 | 36063 | 11.61 |
| | NiAl-DDS | 2.49 | 703.7985 | 3397 | 37363 | 11.00 |
| | ZnAL-DDS | 3.3 | 932.745 | | | |

Figure 3:
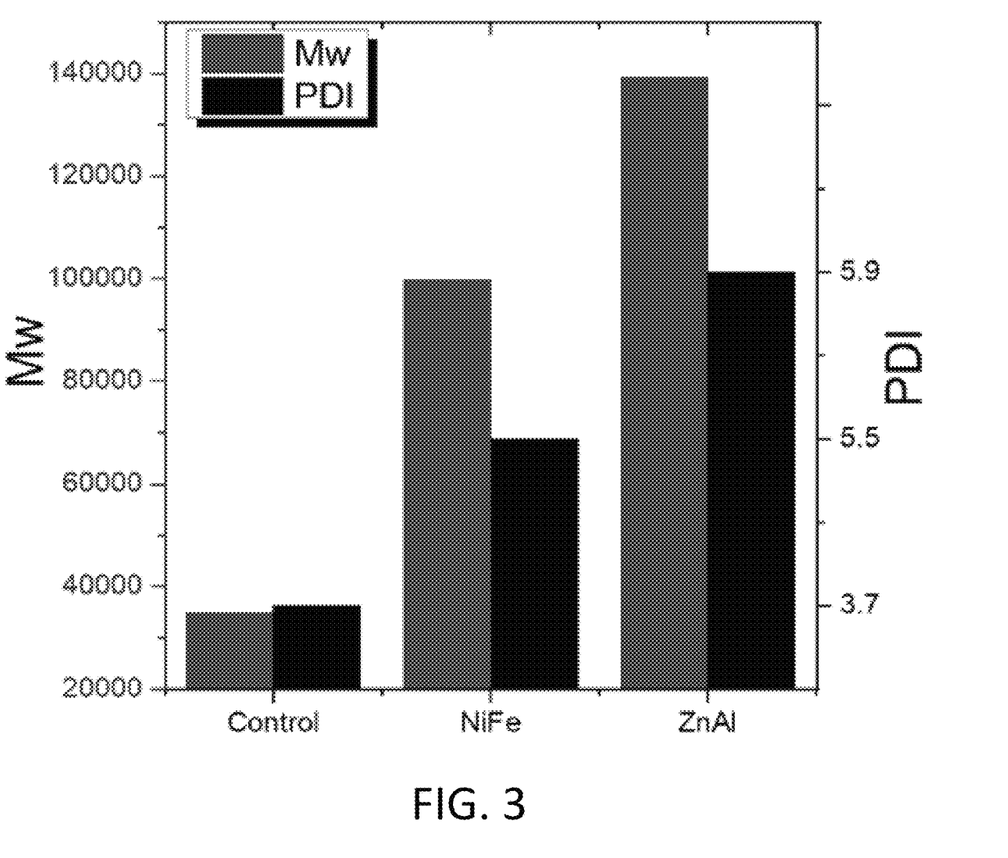
FIG. 3 is a graph depicting the effect of NiFe-DDS and ZnAl-DDS over M, and PDI values of the EP copolymer produced by B—Zr/MAO/LDH (DDS), according to certain embodiments.

NiFe-DDS and ZnAl-DDS were used to immobilize the b-Zr catalyst as shown in Table 3 and FIG. 3. The supported catalyst complex is more active than that of its homogenous analogue. B—Zr/MAO/ZnAl and B—Zr/MAO/NiFe showed 144% and 153% higher activity, respectively in comparison with the homogenous B—Zr catalyst.

TABLE 3

Lists the catalytic activity of B-Zr/MAO/LDH and the Mn, Mw and PDI values of the produced EP copolymer Dichloro[rac-ethylenebis(indenyl)]zirconium(IV)

| support | Yield | Mn | Mw | PDI |
|---|---|---|---|---|
| Homogenous (Neat EP) | 2.15 | 9411.5 | 34772 | 3.7 |
| NiFe | 3.29 | 18166.5 | 99787.5 | 5.5 |
| ZnAl | 3.11 | 23505.5 | 139263 | 5.9 |

Example 7: EP Copolymer Molecular Weight Characterization

The microstructure of the polymer synthesized using the LDH supported catalysts are characterized in accordance with its molecular weight. The polymer chain with reasonably high molecular weight may exhibit higher melting temperature and high thermal stability. To examine the legitimacy of argument in support of higher melting temperature, the polymer samples were characterized by the GPC to study their molecular weight. All polymers synthesized using the LDH supported catalyst showed a higher weight average molecular weight ($M_w$) as depicted in Tables. 1-3 and FIGS. 1-3. This could be one of the reasons that the polymer synthesized using the LDH supported catalysts showed enhanced thermal properties. In this work, we have achieved 5- and 10-fold higher M, for the Zr/MAO/NiFe-DDS and Zr/MAO/NiFe—$CO_3$ catalysts, respectively than the M, of the EP synthesized by homogenous Zr. While in case of supported B—Zr catalyst on Nife and ZnAl-DDS, the M, achieved were 3- and 4-fold, respectively than the EP produced by homogenous B—Zr.

B—Zr/MAO/ZnAl-DDS and its NiFe-DDS analog also showed higher activity and M, than the neat EP. Neat EP has low relatively low molecular weight and a narrow PDI value, however, the application of the supported catalyst complex yielded a polymer with high molecular weight and relatively higher PDI.

An observation has been drawn that the LDH supported catalyst yielded polymers with higher molecular weight and higher polydispersity index (PDI). Depending upon the targeted applications the polymers with high PDI are preferred for easy processing.

Numerous modifications and variations of the present disclosure are possible in light of the above teachings. It is therefore to be understood that within the scope of the appended claims, the invention may be practiced otherwise than as specifically described herein.

The invention claimed is:

1. A method of making an ethylene-propylene (EP) copolymer, comprising:
   immobilizing a metallocene catalyst complex on a layered double hydroxide (LDH) to form a supported metallocene catalyst complex;
   mixing the supported metallocene catalyst complex in a nonpolar solvent to form a first mixture;
   degassing the first mixture and saturating with a gaseous mixture of ethylene and propylene to form a second mixture;
   mixing an aluminoxane activator with the second mixture to initiate a polymerization reaction of the ethylene and propylene to form a reaction mixture comprising the ethylene-propylene copolymer; and
   separating the ethylene-propylene copolymer from the reaction mixture;
   wherein the LDH is at least one selected from the group consisting of a NiFe LDH, a ZnAl LDH, a MgAl LDH, a MgFe LDH, and a NiAl LDH; and
   wherein the LDH has an intercalating anion selected from the group consisting of a carbonate anion, a carbonate/acetone anion, a nitrate anion, and a dodecyl sulfate (DDS) anion.

2. The method of claim 1, wherein the metallocene catalyst complex is at least one selected from the group consisting of a bis(cyclopentadienyl)zirconium(IV) dichloride, and a dichloro[rac-ethylenebis(indenyl)]zirconium (IV).

3. The method of claim 2, wherein the zirconocene is immobilized on the LDH having:
   a delaminated structure comprising charged crystalline particles; and
   a basal spacing in a range of 0.5 to 5 nm.

4. The method of claim 1, wherein the LDH has an intercalating anion selected from the group consisting of a carbonate anion, a carbonate/acetone anion, and a nitrate anion; and
   the LDH has a basal spacing of 0.5 to 1.0 nm.

5. The method of claim 1, wherein the LDH has a dodecyl sulfate (DDS) intercalating anion; and
   the LDH has a basal spacing of 2 to 3 nm.

6. The method of claim 1, wherein the LDH has a mean particle size in the lateral dimension of from 5 to 100 microns (p).

7. The method of claim 1, wherein the LDH comprises a first metal and a second metal; and a molar ratio of the first metal to the second metal in a range of 2:1 to 4:1.

8. The method of claim 1, wherein the supported metallocene catalyst complex has a weight ratio of the metallocene catalyst complex to the LDH of 1:1 to 1:10.

9. The method of claim 1, wherein the gaseous mixture is 70-95 volume percent (v %) ethylene and 5-30 v % propylene based on a total volume of the gaseous mixture.

10. The method of claim 1, wherein the gaseous mixture has a pressure of 1-10 pound-force per square inch (psi) in the second mixture during the mixing.

11. The method of claim 1, wherein the supported metallocene catalyst complex is present in the first mixture at a concentration of 0.1 to 0.5 milligram per millimeter (mg/mL).

12. The method of claim 1, wherein the supported metallocene catalyst complex after the mixing with the aluminoxane activator, has a catalytic activity of 500 to 1200 kilograms of the ethylene-propylene copolymer per mole per hour per bar (kg EP/mol/hr/bar).

13. The method of claim 1, wherein the aluminoxane activator is methylaluminoxane.

14. The method of claim 1, wherein the ethylene-propylene copolymer has a higher molecular weight than an ethylene-propylene copolymer made by the same method but wherein the metallocene catalyst complex is not supported on an LDH.

15. The method of claim 1, wherein the ethylene-propylene copolymer has a higher polydispersity index (PDI) than an ethylene-propylene copolymer made by the same method but wherein the metallocene catalyst complex is not supported on an LDH.

16. The method of claim 1, wherein the ethylene-propylene copolymer has a higher melting temperature than an ethylene-propylene copolymer made by the same method but wherein the metallocene catalyst complex is not supported on an LDH.

17. The method of claim 1, wherein the ethylene-propylene copolymer has a better thermal stability than an ethylene-propylene copolymer made by the same method but wherein the metallocene catalyst complex is not supported on an LDH.

* * * * *